(12) United States Patent
Kwon et al.

(10) Patent No.: US 7,738,353 B2
(45) Date of Patent: Jun. 15, 2010

(54) RECORDING MEDIUM, METHOD AND APPARATUS FOR REPRODUCING DATA ON THE RECORDING MEDIUM, AND METHOD AND APPARATUS FOR RECORDING DATA ON THE RECORDING MEDIUM

(75) Inventors: Joon-hwan Kwon, Suwon-si (KR); Kyung-geun Lee, Seongnam-si (KR); Sung-hee Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 105 days.

(21) Appl. No.: 11/940,452

(22) Filed: Nov. 15, 2007

(65) Prior Publication Data

US 2008/0117793 A1 May 22, 2008

(30) Foreign Application Priority Data

Nov. 17, 2006 (KR) ...................... 10-2006-0113903

(51) Int. Cl.
*G11B 7/24* (2006.01)
(52) U.S. Cl. .................................. 369/275.3
(58) Field of Classification Search ........................ None
See application file for complete search history.

(56) References Cited

U.S. PATENT DOCUMENTS

2005/0055500 A1 3/2005 Park
2005/0210045 A1* 9/2005 Park ........................ 707/100
2006/0077816 A1* 4/2006 Park ........................ 369/47.1

FOREIGN PATENT DOCUMENTS

KR 2005-99954 10/2005

OTHER PUBLICATIONS

Search Report issued on Feb. 26, 2008 by the International Searching Authority for International Patent Application No. PCT/KR2007-005721.

* cited by examiner

*Primary Examiner*—Joseph H Feild
*Assistant Examiner*—Henok G Heyi
(74) *Attorney, Agent, or Firm*—NSIP Law

(57) ABSTRACT

A recording medium on which data is recorded in units of clusters, a method and apparatus for reproducing data on the recording medium, and a method and apparatus for recording data on the recording medium, wherein each of the clusters includes a plurality of address fields, each address field includes 32-bit address unit number (AUN) address information, and the AUN address information includes a reserved area recorded on 4 bits, layer information, recorded on 3 bits, indicating a layer on which data corresponding to the AUN address information is recorded, and location information, recorded on 25 bits, indicating a location of the data corresponding to the AUN address information. In the recording medium of the present invention, a space in which addresses are recorded is expanded, thereby securing an address area in which addresses of data can be recorded in a data structure.

14 Claims, 8 Drawing Sheets

FIG. 3

| | | 0 | 1 | : | S | : | 15 |
|---|---|---|---|---|---|---|---|
| | | \multicolumn{6}{c}{16 ADDRESS FIELD} |
| AUN | | $AF_{0,0}$ $AF_{1,0}$ ⋮ $AF_{3,0}$ | $AF_{0,1}$ $AF_{1,1}$ ⋮ $AF_{3,1}$ | · · · · | $AF_{0,S}$ $AF_{1,S}$ ⋮ $AF_{3,S}$ | · · · · | $AF_{0,15}$ $AF_{1,15}$ ⋮ $AF_{3,15}$ |
| FLAG | | $AF_{4,0}$ | $AF_{4,1}$ | : | $AF_{4,S}$ | : | $AF_{4,15}$ |
| PARITY | | $AF_{5,0}$ ⋮ $AF_{8,0}$ | $AF_{5,1}$ ⋮ $AF_{8,1}$ | · · · | $AF_{5,S}$ ⋮ $AF_{8,S}$ | · · · | $AF_{5,15}$ ⋮ $AF_{8,15}$ |

9 BYTES

RECORDING MEDIUM, METHOD AND APPARATUS FOR REPRODUCING DATA ON THE RECORDING MEDIUM, AND METHOD AND APPARATUS FOR RECORDING DATA ON THE RECORDING MEDIUM

CROSS-REFERENCE TO RELATED APPLICATION

This application claims the benefit of Korean Application No. 2006-113903, filed Nov. 17, 2006 in the Korean Intellectual Property Office, the disclosure of which is incorporated herein by reference.

BACKGROUND OF THE INVENTION

1. Field of the Invention

Aspects of the present invention relate to a recording medium, a method and apparatus for reproducing data on the recording medium, and a method and apparatus for recording data on the recording medium.

2. Description of the Related Art

New high density recording media have been developed recently and allow large amounts of high quality video and audio data to be recorded and stored thereon. Examples of such high density recording media include Blu-ray discs (BD), high definition digital versatile discs (HD-DVD), and disks with even higher recording densities than those of BDs and HD-DVDs.

The above high density recording media are based on a next-generation recording medium technology. Specifically, the high density recording media are next-generation optical recording solutions that can store amounts of data far exceeding those of conventional recording media (such as DVDs). Furthermore, the development of such high density recording media has recently been carried out together with other digital devices.

FIG. 1 is a diagram illustrating a structure of a recording area of a high density optical recording medium. Referring to FIG. 1, the optical recording medium is divided into 3 parts: a lead-in area, a data area and a lead-out area. In particular, the data area includes a user data area, in which actual user data is recorded, and a spare area to replace a defective area in the user data area. The spare area includes an inner spare area (ISA) located in an inner portion of the data area, and an outer spare area (OSA) located in an outer portion of the data area.

In the optical recording medium structure as illustrated in FIG. 1, data is recorded in units of clusters in all areas of the data area. In particular, each cluster is divided into a plurality of recording units. For example, in the present disclosure, the recording unit is referred to as a sector, each cluster includes a total of 32 sectors, and one address unit number (AUN) is assigned to every two sectors. Accordingly, in each cluster, a total of 16 AUN addresses are recorded. From the recorded AUNs, the address location of each sector can be confirmed. The confirmed sector address is referred to as a physical sector number (PSN).

FIG. 2 is a diagram illustrating a structure of a data frame recorded on the high density optical recording medium. Referring to FIG. 2, a method of forming an error correction code (ECC) in a cluster is shown. First, data to be recorded is formed with user data desired to be recorded and user control data (201). A 4-byte error detection code (EDC) is added to the user data, thereby forming a data frame (202). The data frame forms a scramble data frame (203). Each column of the scramble data frame is again rearranged, thereby forming one data block comprised of 304 columns×216 lines (204).

In order to provide an error correction characteristic to the data block, a Reed-Solomon (RS) code is added to the data block, thereby forming a long distance code (LDC) block (205). Then, using an interleaving process to prevent a concentrated occurrence of errors, the LDC block is transformed to form an LDC cluster of 152 columns×496 lines (206).

By using an address unit including 16 AUN values and control information (207) (16 addresses×9 bytes), the user control data forms an access block so that a recording and reproducing apparatus can access data in a corresponding cluster having 24 columns×30 lines (208). In order to provide an error correction characteristic to the access block, an RS code is added to the access block, thereby forming a BIS block having an additional 32 lines of parity (209). Through an interleaving process to prevent a concentrated occurrence of errors, the BIS block is transformed to form a BIS cluster of 3 columns×496 lines (210).

The LDC cluster and the BIS cluster are divided and arranged in order of LDC, BIS, LDC, BIS, LDC, BIS, LDC, thereby forming a 155 byte ECC cluster (211). Each LDC has a 38 byte size, and each BIS has a 1 byte size in the data frame. Finally, synchronization information and the like are added to the formed ECC cluster, and recorded in a predetermined cluster in the data area (212). The resultant frame has a 20 bit frame sync, and alternating pairs of 25 bit data and 1 bit DC control data.

The capacity of recording media having a data structure as illustrated in FIG. 2 is gradually increasing. However, with the increasing capacity of such recording media, a problem arises in how to secure an address area in the data structure in which the addresses can be recorded.

SUMMARY OF THE INVENTION

Aspects of the present invention provide a high density recording medium in which an address area can be secured in a data structure, a method and apparatus for reproducing data on the recording medium, and a method and apparatus for recording data on the recording medium.

According to an aspect of the present invention, there is provided a recording medium on which data is recorded in units of clusters, wherein each of the clusters includes a plurality of address fields, each address field includes 32-bit address unit number (AUN) address information, and the AUN address information includes: a reserved area recorded on 4 bits; layer information, recorded on 3 bits, indicating a layer on which data corresponding to the AUN address information is recorded; and location information, recorded on 25 bits, indicating a location of the data corresponding to the AUN address information.

According to an aspect of the present invention, each of the clusters may include a plurality of sectors, and an address field may be allocated to every two sectors of the plurality of sectors.

According to an aspect of the present invention, each of the clusters may include 16 address fields.

According to an aspect of the present invention, the reserved area may include state information on defects occurring on the recording medium.

According to an aspect of the present invention, in addition to the AUN address information, each of the address fields may further include 1-byte flag information and a 4-byte parity information for the address field.

According to an aspect of the present invention, the 1-byte flag information may include additional information other than the address information of the cluster.

According to another aspect of the present invention, there is provided a recording medium on which data is recorded in units of clusters, wherein each of the clusters includes a plurality of address fields, each address field includes 32-bit AUN address information, and the AUN address information includes: a reserved area recorded on 4 bits; a capacity expansion area recorded on 1 bit; layer information, recorded on 3 bits, indicating a layer on which data corresponding to the AUN address information is recorded; and location information, recorded on 24 bits, indicating a location of data corresponding to the AUN address information.

According to an aspect of the present invention, each of the clusters may include a plurality of sectors, and an address field may be allocated to every two sectors of the plurality of sectors.

According to an aspect of the present invention, each of the clusters may include 16 address fields.

According to an aspect of the present invention, the reserved area may include state information on defects occurring on the recording medium.

According to an aspect of the present invention, the capacity expansion area may be used when all locations of data corresponding to the AUN address information cannot be expressed by the remaining 24 bits.

According to an aspect of the present invention, in addition to the AUN address information, each of the address fields may further include 1-byte flag information and 4-byte parity information for the address field.

According to an aspect of the present invention, the 1-byte flag information may include additional information other than the address information of the cluster.

According to yet another aspect of the present invention, there is provided a recording medium on which data is recorded in units of clusters, wherein each of the clusters includes a plurality of address fields, each address field includes 32-bit AUN address information, and the AUN address information includes: a reserved area recorded on 5 bits; layer information, recorded on 3 bits, indicating a layer on which data corresponding to the AUN address information is recorded; and location information, recorded on 24 bits, indicating a location of data corresponding to the AUN address information, wherein, in the remaining 24 bits indicating the location of the data corresponding to the AUN address information, the least significant bit is used as a flag to determine one of two separate areas in which data is recorded on the recording medium.

According to an aspect of the present invention, the least significant bit of each of the address fields may be used to determine either an area indicating 0 or an area indicating 1.

According to an aspect of the present invention, each of the clusters may include a plurality of sectors, and an address field may be allocated to every two sectors of the plurality of sectors.

According to an aspect of the present invention, each of the clusters may include 16 address fields.

According to an aspect of the present invention, the reserved area may include state information on defects occurring on the recording medium.

According to an aspect of the present invention, in addition to the AUN address information, each of the address fields may further include 1-byte flag information and 4-byte parity information for the address field.

According to an aspect of the present invention, the 1-byte flag information may include additional information other than the AUN address information of the cluster.

According to still another aspect of the present invention, there is provided a method of reproducing data on a recording medium on which the data is recorded in units of clusters, the method including: moving an optical head unit to a target location of the recording medium at which data corresponding to address information is recorded; and reproducing the data at the target location of the recording medium, wherein each of the clusters includes a plurality of address fields. each address field includes 32-bit AUN address information, and the AUN address information includes: a reserved area recorded on 4 bits; layer information, recorded on 3 bits, indicating a layer on which data corresponding to the AUN address information is recorded; and location information, recorded on 25 bits, indicating a location of the data corresponding to the AUN address information.

According to another aspect of the present invention, there is provided a method of reproducing data on a recording medium on which the data is recorded in units of clusters, the method including: moving an optical head unit to a target location of the recording medium at which data corresponding to address information is recorded; and reproducing the data at the target location of the recording medium, wherein each of the clusters includes a plurality of address fields, each address field includes 32-bit AUN address information, and the AUN address information includes: a reserved area recorded on 4 bits; a capacity expansion area recorded on 1 bit; layer information, recorded on 3 bits, indicating a layer on which data corresponding to the AUN address information is recorded; and location information, recorded on 24 bits, indicating a location of data corresponding to the AUN address information.

According to another aspect of the present invention, there is provided a method of reproducing data on a recording medium on which the data is recorded in units of clusters, the method including: moving an optical head unit to a target location of the recording medium at which data corresponding to address information is recorded; and reproducing the data at the target location of the recording medium, wherein each of the clusters includes a plurality of address fields, each address field includes 32-bit AUN address information, and the AUN address information includes: a reserved area recorded on 5 bits; layer information, recorded on 3 bits, indicating a layer on which data corresponding to the AUN address information is recorded; and location information, recorded on 24 bits, indicating a location of the data corresponding to the AUN address information, wherein the least significant bit of the remaining 24 bits indicating the location of the data corresponding to the AUN address information is used as a flag to determine one of two separate areas in which data is recorded on the recording medium.

According to still another aspect of the present invention, there is provided an apparatus for reproducing data on a recording medium on which the data is recorded in units of clusters, the apparatus including: a control unit moving an optical head unit to a target location of the recording medium at which data corresponding to address information is recorded; and a pickup unit reproducing the data at the target location of the recording medium, wherein each of the clusters includes a plurality of address fields, each address field includes 32-bit AUN address information, and the AUN address information includes a reserved area recorded on 4 bits; layer information, recorded on 3 bits, indicating a layer on which data corresponding to the AUN address information is recorded; and location information, recorded on 25 bits, indicating a location of the data corresponding to the AUN address information.

According to another aspect of the present invention, there is provided an apparatus for reproducing data on a recording medium on which the data is recorded in units of clusters, the apparatus including: a control unit moving an optical head unit to a target location of the recording medium at which data corresponding to address information is recorded; and a pickup unit reproducing the data at the target location of the recording medium, wherein each of the clusters includes a plurality of address fields, each address field includes 32-bit AUN address information, and the AUN address information includes: a reserved area recorded on 4 bits; a capacity expansion area recorded on 1 bit; layer information, recorded on 3 bits, indicating a layer on which data corresponding to the AUN address information is recorded; and location information, recorded on 24 bits, indicating a location of the data corresponding to the AUN address information.

According to another aspect of the present invention, there is provided an apparatus for reproducing data on a recording medium on which the data is recorded in units of clusters, the apparatus including: a control unit moving an optical head unit to a target location of the recording medium at which data corresponding to address information is recorded; and a pickup unit reproducing the data at the target location of the recording medium, wherein each of the clusters includes a plurality of address fields, each address field includes 32-bit AUN address information, and the AUN address information includes: a reserved area recorded on 5 bits; layer information, recorded on 3 bits, indicating a layer on which data corresponding to the AUN address information is recorded; and location information, recorded on 24 bits, indicating a location of the data corresponding to the AUN address information, wherein the least significant bit of the remaining 24 bits indicating the location of the data corresponding to the AUN address information, is used as a flag to determine one of two separate areas in which data is recorded on the recording medium.

According to another aspect of the present invention, there is provided a method of recording data on a recording medium in units of clusters, the method including: generating a cluster in which addresses and data are recorded; and recording the generated cluster on the recording medium, wherein each of the clusters includes a plurality of address fields, each address field includes 32-bit AUN address information, and the AUN address information includes: a reserved area recorded on 4 bits; layer information, recorded on 3 bits, indicating a layer on which data corresponding to the AUN address information is recorded; and location information, recorded on 25 bits, indicating a location of the data corresponding to the AUN address information.

According to another aspect of the present invention, there is provided a method of recording data on a recording medium in units of clusters, the method including: generating a cluster in which addresses and data are recorded; and recording the generated cluster on the recording medium, wherein the cluster includes a plurality of address fields, each address field includes 32-bit AUN address information, and the AUN address information includes: a reserved area recorded on 4 bits; a capacity expansion area recorded on 1 bit; layer information, recorded on 3 bits, indicating a layer on which data corresponding to the AUN address information is recorded; and location information, recorded on 24 bits, indicating a location of the data corresponding to the AUN address information.

According to another aspect of the present invention, there is provided a method of recording data on a recording medium in units of clusters, the method including: generating a cluster in which addresses and data are recorded; and recording the generated cluster on the recording medium, wherein the cluster includes a plurality of address fields, each address field includes 32-bit AUN address information, and the AUN address information includes: a reserved area recorded on 5 bits; layer information, recorded on 3 bits, indicating a layer on which data corresponding to the AUN address information is recorded; and location information, recorded on 24 bits, indicating a location of the data corresponding to the AUN address information, wherein the least significant bit of the remaining 24 bits indicating the location of the data corresponding to the AUN address information, is used as a flag to determine one of two separate areas in which data is recorded on the recording medium.

According to another aspect of the present invention, there is provided an apparatus for recording data on a recording medium in units of clusters, the apparatus including: a signal processing unit generating a cluster in which addresses and data are recorded; and a pickup unit recording the generated cluster on the recording medium, wherein the cluster includes a plurality of address fields, each address field includes 32-bit AUN address information, and the AUN address information includes: a reserved area recorded on 4 bits; layer information, recorded on 3 bits, indicating a layer on which data corresponding to the AUN address information is recorded; and location information, recorded on 25 bits, indicating a location of the data corresponding to the AUN address information.

According to another aspect of the present invention, there is provided an apparatus for recording data on a recording medium in units of clusters, the apparatus including: a signal processing unit generating a cluster in which addresses and data are recorded; and a pickup unit recording the generated cluster on the recording medium, wherein the cluster includes a plurality of address fields, each address field includes 32-bit AUN address information, and the AUN address information includes: a reserved area recorded on 4 bits; a capacity expansion area recorded on 1 bit; layer information, recorded on 3 bits, indicating a layer on which data corresponding to the AUN address information is recorded; and location information, recorded on 24 bits, indicating a location of the data corresponding to the AUN address information.

According to another aspect of the present invention, there is provided an apparatus for recording data on a recording medium in units of clusters, the apparatus including: a signal processing unit generating a cluster in which addresses and data are recorded; and a pickup unit recording the generated cluster on the recording medium, wherein the cluster includes a plurality of address fields, each address field includes 32-bit AUN information, and the AUN address information includes: a reserved area recorded on 5 bits; layer information, recorded on 3 bits, indicating a layer on which data corresponding to the AUN address information is recorded; and location information, recorded on 24 bits, indicating a location of the data corresponding to the AUN address information, wherein the least significant bit of the remaining 24 bits indicating the location of the data corresponding to the AUN address information is used as a flag to determine one of two separate areas in which data is recorded on the recording medium.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become more apparent and more readily appreciated from the following description of the embodiments, taken in conjunction with the accompanying drawings of which:

FIG. 3 is a diagram illustrating a structure of an address unit included in data recorded on an optical recording medium;

DETAILED DESCRIPTION OF THE EMBODIMENTS

Figure 1:
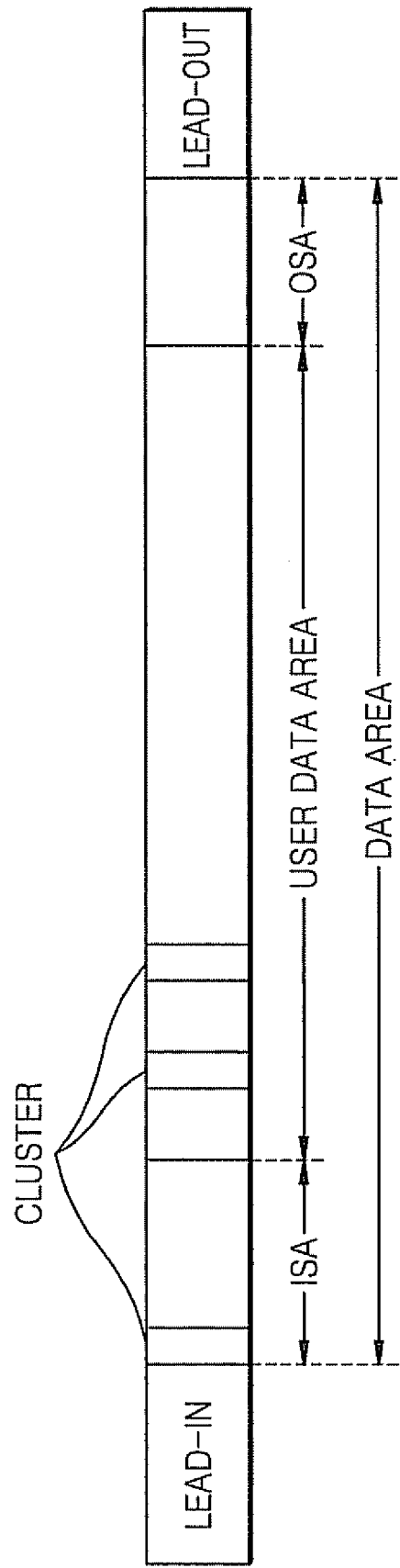
FIG. 1 is a diagram illustrating a conventional structure of a recording area of an optical recording medium.
Figure 2:
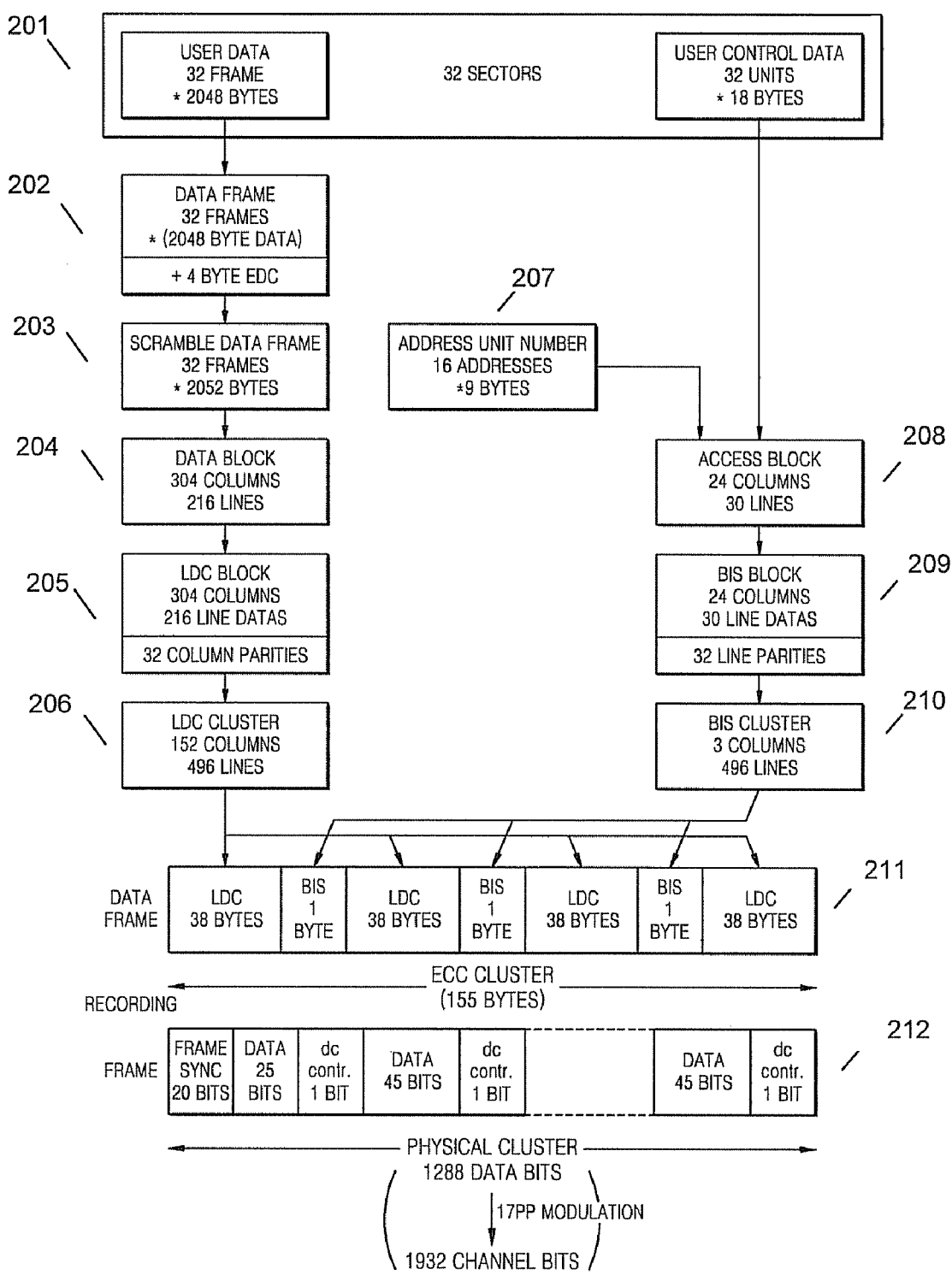
FIG. 2 is a diagram illustrating a conventional structure of a data frame recorded on an optical recording medium.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 3 is a diagram illustrating a structure of an address unit included in data recorded on an optical recording medium. Referring to FIG. 3, one cluster has 16 address fields, each of which has a capacity of 9 bytes. Each of the address fields has 4-byte address unit number (AUN) address information, 1-byte flag information, and 4-byte parity information for the address field. The AUN address information indicates the address of an ECC cluster among a plurality of ECC clusters.

The flag information is recorded in the fifth byte of the address field, next to the AUN address information, and is used to record additional information other than location information. For example, the flag information can be used to indicate a date and time when data is recorded. A parity bit for the address field is recorded in the remaining 4 bytes. This parity bit is for error correction.

Figure 4:
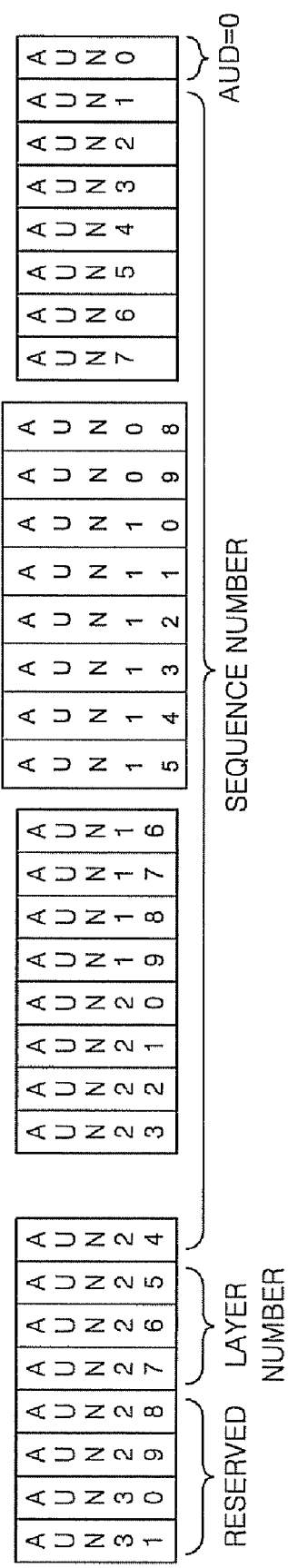
FIG. 4 is a diagram illustrating a structure of address unit number (AUN) address information according to an embodiment of the present invention.

FIG. 4 is a diagram illustrating a structure of AUN address information according to an embodiment of the present invention. Each address field includes 9-byte address information. In the 9-byte address information, 4 bytes are allocated to AUN address information, which indicates the address of an ECC cluster among a plurality of ECC clusters. Since 1 byte is composed of 8 bits, the 4-byte information includes 32 bits.

Referring to FIG. 4, the high-order 4 bits (i.e., bits 28-31) in the AUN address information are allocated as a reserved area. The next 3 bits (i.e., 25-27) indicate layer information on the layer in which data corresponding to the AUN address information is recorded. The remaining 25 bits (i.e., bits 0-24) indicate the location of data corresponding to the AUN address information. The reserved area on a writable or rewritable disk can be used to indicate additional information other than location information. For example, the reserved area can be used to indicate state information of defect list entries having a cluster address in which a defect occurs, and a cluster address replacing the defective cluster address.

The layer information indicates a number of a layer of the recording medium in which the data corresponding to the AUN address information is recorded. As the location of the data corresponding to the AUN address information is expressed by 25 bits, an address space corresponding to $2^{25}$ can be expressed in each layer. One address is assigned to two user data sectors. Accordingly, the least significant bit (i.e., bit 0) of the AUN address information is fixed as 0.

Figure 5:
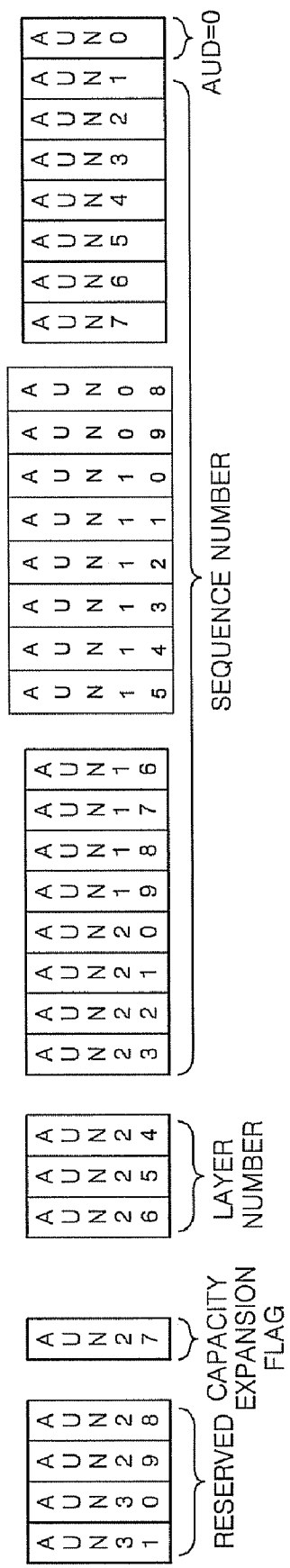
FIG. 5 is a diagram illustrating a structure of AUN address information according to another embodiment of the present invention.

FIG. 5 is a diagram illustrating a structure of AUN address information according to another embodiment of the present invention. In an address unit, 4 bytes (i.e., 32 bits) are allocated to AUN address information. Referring to FIG. 5, in the 32 bits, the high-order 4 bits (i.e., bits 28-31) are allocated as a reserved area, the next bit (i.e., bit 27) is allocated as a capacity expansion area, the next 3 bits (i.e., bits 24-26) indicate layer information on a layer in which data corresponding to the AUN address information is recorded, and the remaining 24 bits (i.e., bits 0-23) indicate the location of the data corresponding to the AUN.

The reserved area can be used to include additional information other than location information on a writable and rewritable disk (such as included in the reserved area illustrated in FIG. 4). For example, the reserved area may be used to store state information of defect list entries having a cluster address in which a defect occurs, and a cluster address replacing the defective cluster address. The capacity expansion area can be used to record a location of data when locations of data corresponding to the AUN address information cannot be expressed by the remaining 24 bits allocated to indicate the location of the data. When data using a space greater than the space corresponding to $2^{24}$ is recorded, the capacity expansion area is used to thereby record addresses of the space corresponding to $2^{25}$. Finally, since one address is assigned to two user data sectors, the least significant bit (i.e., bit 0) of the AUN address information is fixed as 0.

Figure 6:
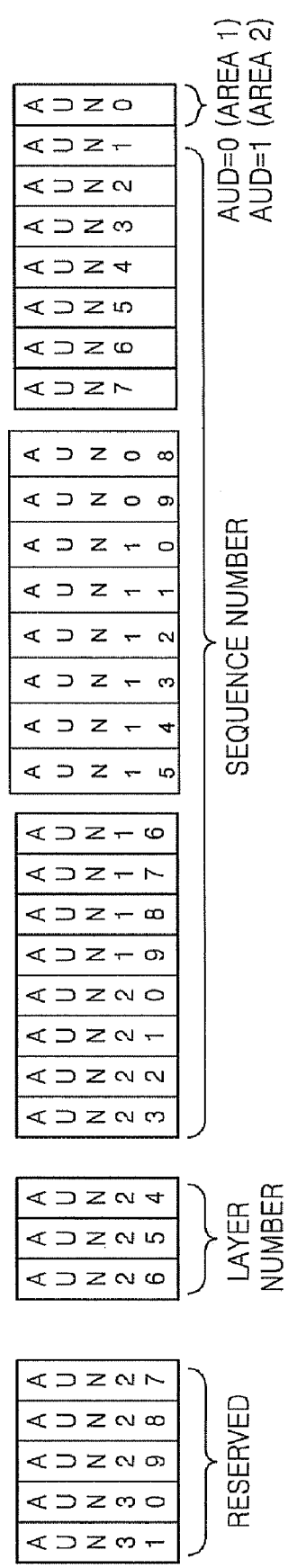
FIG. 6 is a diagram illustrating a structure of AUN address information according to yet another embodiment of the present invention.

FIG. 6 is a diagram illustrating a structure of AUN address information, according to yet another embodiment of the present invention. 32 bits are allocated to the AUN address information according to the current embodiment of the present invention. Referring to FIG. 6, the high-order 5 bits (i.e., bits 27-31) are allocated as a reserved area, the next 3 bits (i.e., bits 24-26) indicate layer information on a layer in which data corresponding to the AUN address information is recorded, and the next 24 bits (i.e., bits 0-23) indicate the location of the data corresponding to the AUN address information. The reserved area can be used to store state information of defect list entries having a cluster address in which a defect occurs, and a cluster address replacing the defective cluster address.

In the 24 bits indicating the location of the data corresponding to the AUN address information, the least significant bit is used as a flag to indicate one of two separate areas in which data is recorded. The flag is set to 0 for a first area, and 1 for a second area. Therefore, the location in which data is recorded can be determined as the first area or the second area. For example, an address 00 may be assigned to addresses 00 and 01, and an address 10 may be assigned to addresses 10, and 11. That is, since one address is assigned to two sectors, the least significant bit is always 0. However, by using the least significant bit, two areas are distinguished. If the bit is 0, it is determined that the location in which data is recorded is the first area, and if the bit is 1, it is determined that the location in which data is recorded is the second area. In this way, the area in which data is recorded can be determined.

Thus, since the location of the data corresponding to the AUN is expressed by 24 bits, and by using the least significant bit of the 24 bits, two areas can be distinguished and addresses of a space corresponding to $2^{24}*2$ can be expressed in each layer.

Figure 7:
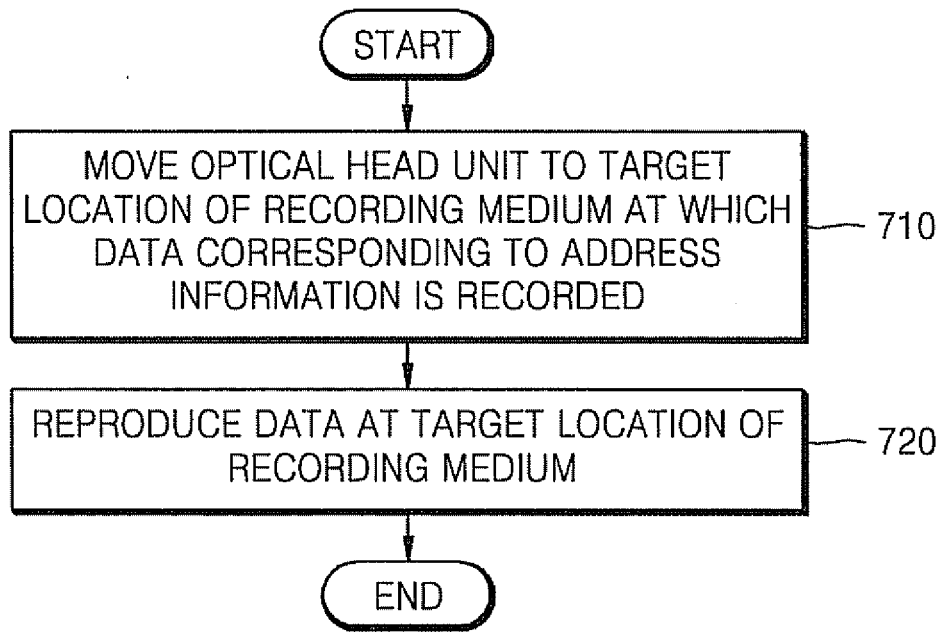
FIG. 7 is a flowchart illustrating a method of reproducing data on a recording medium according to an embodiment of the present invention.

FIG. 7 is a flowchart illustrating a method of reproducing data on a recording medium according to an embodiment of the present invention. Referring to FIG. 7, an optical head unit is moved to a target position of the recording medium corresponding to address information in operation 710.

According to an embodiment of the present invention, one address field includes 32-bit AUN address information. In the 32-bit AUN address information, the high-order 4 bits are allocated as a reserved area, the next 3 bits indicate layer information on a layer in which data corresponding to the AUN address information is recorded, and the remaining 25 bits indicate the location of the data corresponding to the AUN address information, as illustrated in FIG. 4.

According to another embodiment of the present invention, the high-order 4 bits of the 32-bit AUN address information are allocated as a reserved area, the next bit is allocated as a capacity expansion area, the next 3 bits indicate layer information on a layer in which data corresponding to the AUN address information is recorded, and the remaining 24 bits indicate the location of the data corresponding to the AUN address information, as illustrated in FIG. 5.

According to yet another embodiment of the present invention, the high-order 5 bits of the 32-bit AUN address information are allocated as a reserved area, the next 3 bits indicate layer information on a layer in which data corresponding to the AUN address information is recorded, and the remaining 24 bits indicate the location of the data corresponding to the AUN address information, as illustrated in FIG. 6. Addresses are allocated in the 24 bits indicating the location of data such that the least significant bit is used as a flag to determine one of two separate areas in which data is recorded.

Referring back to FIG. 7, the data at the target location to which the optical head unit is moved (operation 710) is reproduced in operation 720.

Figure 8:
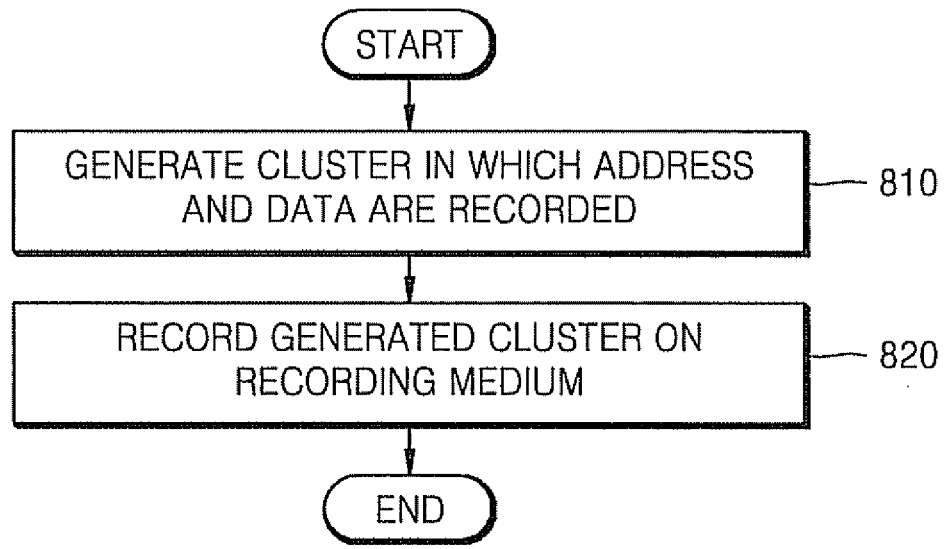
FIG. 8 is a flowchart illustrating a method of recording data on a recording medium according to an embodiment of the present invention.

FIG. 8 is a flowchart illustrating a method of recording data on a recording medium according to an embodiment of the present invention. Referring to FIG. 8, data and a cluster in which an address indicating the location of data are generated in operation 810. In one cluster, 16 address fields are included.

According to an embodiment of the present invention, one address field includes 32-bit AUN address information. In the 32-bit AUN address information, the high-order 4 bits are allocated as a reserved area, the next 3 bits indicate layer information on a layer in which data corresponding to the AUN address information is recorded, and the remaining 25 bits indicate the location of the data corresponding to the AUN address information, as illustrated in FIG. 4.

According to another embodiment of the present invention, the high-order 4 bits of the 32-bit AUN address information are allocated as a reserved area, the next bit is allocated as a capacity expansion area, the next 3 bits indicate layer information on a layer in which data corresponding to the AUN address information is recorded, and the remaining 24 bits indicate the location of the data corresponding to the AUN address information, as illustrated in FIG. 5.

According to yet another embodiment of the present invention, the high-order 5 bits of the 32-bit AUN address information are allocated as a reserved area, the next 3 bits indicate layer information on a layer in which data corresponding to the AUN address information is recorded, and the remaining 24 bits indicate the location of the data corresponding to the AUN address information, as illustrated in FIG. 6. Addresses are allocated in the 24 bits indicating the location of the data corresponding to the AUN address information such that the least significant bit is used as a flag to determine one of two separate areas in which data is recorded.

Referring back to FIG. 8, the generated cluster is recorded on the recording medium in operation 820.

Figure 9:
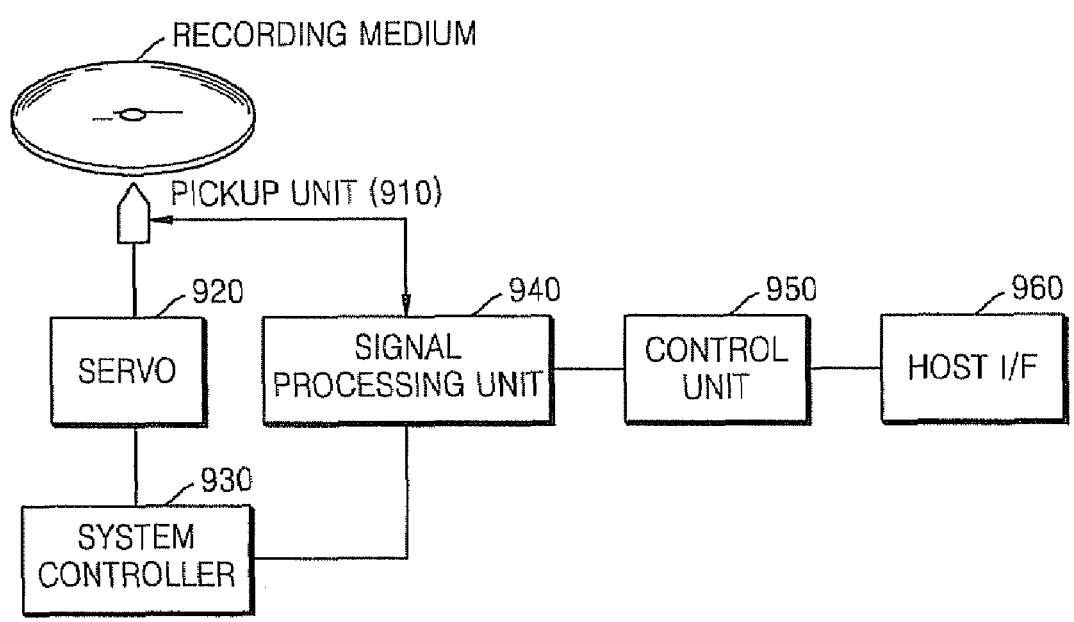
FIG. 9 is a block diagram illustrating an apparatus for recording and/or reproducing data on a recording medium according to an embodiment of the present invention.

FIG. 9 is a block diagram illustrating an apparatus for recording and/or reproducing data on a recording medium according to an embodiment of the present invention. Referring to FIG. 9, the apparatus for recording and/or reproducing data on a recording medium includes a pickup unit 910, a servo 920, a system controller 930, a signal processing unit 940, a control unit 950, and a host interface unit 960.

The pickup unit 910 reproduces data and other information recorded on a recording medium. The servo 920 controls the operation of the pickup unit 910. The signal processing unit 940 restores a reproduction signal received from the pickup unit 910 to a desired signal value, or modulates the signal into a signal that is to be recorded on a recording medium and transfers the modulated signal.

The host interface unit 960 receives a command from a host to record or reproduce a data structure, transfers the command to the control unit 950, and receives data from the control unit 950.

The control unit 950 includes an encoder and a decoder (both not shown). The decoder decodes a signal read from a recording medium, and provides the decoded signal to a host. The encoder converts an input signal to a signal of a predetermined format determined by the control unit 950, and transfers the converted signal to the signal processing unit 940 so that the signal can be recorded on the recording medium.

Furthermore, the control unit 950 controls the signal processing unit 940 to generate an ECC cluster in which addresses and data are recorded. Then the pickup unit 910 records the generated ECC cluster on the recording medium. When a data structure is generated in units of clusters, the signal processing unit 940 assigns addresses to 16 address fields included in each cluster.

According to an embodiment of the present invention, one address field includes 32-bit AUN address information. In the 32-bit AUN address information, the high-order 4 bits are allocated as a reserved area, the next 3 bits indicate layer information on a layer in which data corresponding to the AUN address information is recorded, and the remaining 25 bits indicate the location of the data corresponding to the AUN address information, as illustrated in FIG. 4.

According to another embodiment of the present invention, the high-order 4 bits of the 32-bit AUN address information are allocated as a reserved area, the next bit is allocated as a capacity expansion area, the next 3 bits indicate layer information on a layer in which data corresponding to the AUN address information is recorded, and the remaining 24 bits indicate the location of the data corresponding to the AUN address information, as illustrated in FIG. 5.

According to another embodiment of the present invention, the high-order 5 bits of the 32-bit AUN address information are allocated as a reserved area, the next 3 bits indicate layer information on a layer in which data corresponding to the AUN address information is recorded, and the remaining 24 bits indicate the location of the data corresponding to the AUN address information, as illustrated in FIG. 6. Addresses are allocated in the 24 bits indicating the location of data such that the least significant bit is used as a flag to determine one of two separate areas in which data is recorded.

In the high density recording medium according to aspects of the present invention, a space in which addresses are recorded can be expanded, thereby securing an address area in which addresses of data in a data structure can be recorded. Also, data at a predetermined location can be accurately reproduced, and identification of a location can be quickly performed through a hierarchical structure of layer numbers and sequence numbers.

Aspects of the present invention can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks and optical data storage devices.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A recording medium on which data is recorded in units of clusters to be read by a recording and/or reproducing apparatus, wherein
    each of the clusters comprises a plurality of address fields;
    each address field comprises 32-bit address unit number (AUN) address information; and
    the AUN address information comprises:
    a reserved area recorded on 4 bits,
    a capacity expansion area recorded on 1 bit,
    layer information, recorded on 3 bits, used by the apparatus to determine a layer on which data corresponding to the AUN address information is recorded, and
    location information, recorded on 24 bits, used by the apparatus to determine a location of the data corresponding to the AUN address information.

2. The recording medium as claimed in claim 1, wherein the reserved area comprises state information on defects occurring on the recording medium.

3. The recording medium as claimed in claim 1, wherein the capacity expansion area is used when all locations of the data corresponding to the AUN address information cannot be expressed by the location information.

4. The recording medium as claimed in claim 1, wherein each of the address fields further comprises 1-byte flag information and 4-byte parity information for the corresponding address field.

5. The recording medium as claimed in claim 4, wherein the 1-byte flag information comprises additional information other than the address information of the cluster.

6. A recording medium on which data is recorded in units of clusters to be read by a recording and/or reproducing apparatus, wherein:
    each of the clusters comprises a plurality of address fields;
    each address field comprises 32-bit address unit number (AUN) address information; and
    the AUN address information comprises:
    a reserved area recorded on 5 bits,
    layer information, recorded on 3 bits, used by the apparatus to determine a layer on which data corresponding to the AUN address information is recorded, and
    location information, recorded on 24 bits, used by the apparatus to determine a location of the data corresponding to the AUN address information, such that a least significant bit of the 24 bits is used as a flag to determine one of two separate areas in which the data is recorded on the recording medium.

7. The recording medium as claimed in claim 6, wherein the reserved area comprises state information on defects occurring on the recording medium.

8. The recording medium as claimed in claim 6, wherein each of the address fields further comprises 1-byte flag information and 4-byte parity information for the corresponding address field.

9. The recording medium as claimed in claim 8, wherein the 1-byte flag information comprises additional information other than the AUN address information of the cluster.

10. The recording medium as claimed in claim 6, wherein the reserved area is recorded on a highest order 5 bits and the layer information is recorded on 3 bits next to the highest order 4 bits.

11. A method of reproducing data on a recording medium on which the data is recorded in units of clusters, the method comprising:
    moving an optical head unit to a target location of the recording medium at which data corresponding to address unit number (AUN) address information is recorded; and
    reproducing the data at the target location of the recording medium,
    wherein each of the clusters comprises a plurality of address fields, each address field comprises 32-bit AUN address information, and the AUN address information comprises:
    a reserved area recorded on 4 bits,
    a capacity expansion area recorded on 1 bit,
    layer information, recorded on 3 bits, indicating a layer on which data corresponding to the AUN address information is recorded, and
    location information, recorded on 24 bits, indicating a location of the data corresponding to the AUN address information.

12. A method of reproducing data on a recording medium on which the data is recorded in units of clusters, the method comprising:
    moving an optical head unit to a target location of the recording medium at which data corresponding to address unit number (AUN) address information is recorded; and
    reproducing the data at the target location of the recording medium,
    wherein each of the clusters comprises a plurality of address fields, each address field comprises 32-bit AUN address information, and the AUN address information comprises:
    a reserved area recorded on 5 bits,
    layer information, recorded on 3 bits, indicating a layer on which data corresponding to the AUN address information is recorded, and
    location information, recorded on 24 bits, indicating a location of the data corresponding to the AUN address information, such that a least significant bit of the 24 bits is used as a flag to determine one of two separate areas in which the data is recorded on the recording medium.

13. A method of recording data on a recording medium in units of clusters, the method comprising:
    generating a cluster in which addresses and data are recorded; and
    recording the generated cluster on the recording medium, wherein the cluster comprises a plurality of address fields, each address field comprises 32-bit address unit number (AUN) address information, and the AUN address information comprises:

a reserved area recorded on 4 bits, a capacity expansion area recorded on 1 bit, layer information, recorded on 3 bits, indicating a layer on which data corresponding to the AUN address information is recorded, and location information, recorded on 24 bits, indicating a location of the data corresponding to the AUN address information.

14. A method of recording data on a recording medium in units of clusters, the method comprising:

generating a cluster in which addresses and data are recorded; and recording the generated cluster on the recording medium, wherein the cluster comprises a plurality of address fields, each address field comprises 32-bit AUN address information, and the AUN address information comprises:

a reserved area recorded on 5 bits, layer information, recorded on 3 bits, indicating a layer on which data corresponding to the AUN address information is recorded, and location information, recorded on 24 bits, indicating a location of the data corresponding to the AUN address information, such that a least significant bit of the 24 bits is used as a flag to determine one of two separate areas in which the data is recorded on the recording medium.

* * * * *